US012639622B2

(12) United States Patent (10) Patent No.: US 12,639,622 B2
Jung (45) Date of Patent: May 26, 2026

(54) DATA CLUSTERING FOR NETWORK TRAFFIC MODELING

(71) Applicant: AT&T Intellectual Property I, L.P., Atlanta, GA (US)

(72) Inventor: Gueyoung Jung, Belle Mead, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1084 days.

(21) Appl. No.: 17/491,777

(22) Filed: Oct. 1, 2021

(65) Prior Publication Data

US 2023/0105365 A1 Apr. 6, 2023

(51) Int. Cl.
*G06N 20/00* (2019.01)
*H04W 24/08* (2009.01)

(52) U.S. Cl.
CPC ............ *G06N 20/00* (2019.01); *H04W 24/08* (2013.01)

(58) Field of Classification Search
CPC .............................. G06N 20/00; H04W 24/08
See application file for complete search history.

(56) References Cited

U.S. PATENT DOCUMENTS

| | | | |
|---|---|---|---|
| 11,032,735 B2 | 6/2021 | Stawiarski et al. | |
| 11,729,636 B1 * | 8/2023 | Ahmed ................... | G06N 20/00 370/254 |
| 2021/0025882 A1 | 1/2021 | Wang et al. | |
| 2022/0417108 A1 * | 12/2022 | Mayyuri ............. | G06F 18/2148 |
| 2023/0047986 A1 * | 2/2023 | Wu ................... | H04W 28/0861 |
| 2024/0057021 A1 * | 2/2024 | Pezeshki ............. | H04W 72/046 |
| 2024/0089757 A1 * | 3/2024 | Coyle .................... | G06N 20/10 |

FOREIGN PATENT DOCUMENTS

WO WO-2022028793 A1 * 2/2022

OTHER PUBLICATIONS

Na, Shi, Liu Xumin, and Guan Yong. "Research on k-means clustering algorithm: An improved k-means clustering algorithm." 2010 Third International Symposium on intelligent information technology and security informatics. Ieee, 2010. (Year: 2010).*

* cited by examiner

*Primary Examiner* — Andrew T Chiusano
(74) *Attorney, Agent, or Firm* — Guntin & Gust, PLC; John G. Rauch

(57) ABSTRACT

The described technology is generally directed towards data clustering for network traffic modeling. Cellular network measurement data from different geographic areas can be separated into clusters based on similarities in network performance indicators, cell traffic load data, their changing pattern over time, and/or other metrics. A machine learning model can then be assigned to each cluster, and the machine learning models can be trained to make network traffic control decisions under conditions exhibited in their respective clusters. If the error rate of the trained machine learning models is acceptable, then the machine learning models can be deployed for use at network equipment. If the overall error rate is not acceptable, then the cellular network measurement data can be re-separated into a larger number of clusters, and machine learning models can again be trained for each cluster. The re-separation of data and re-training of machine learning models can repeat until the error rate is acceptable and the machine learning models can be deployed.

20 Claims, 10 Drawing Sheets

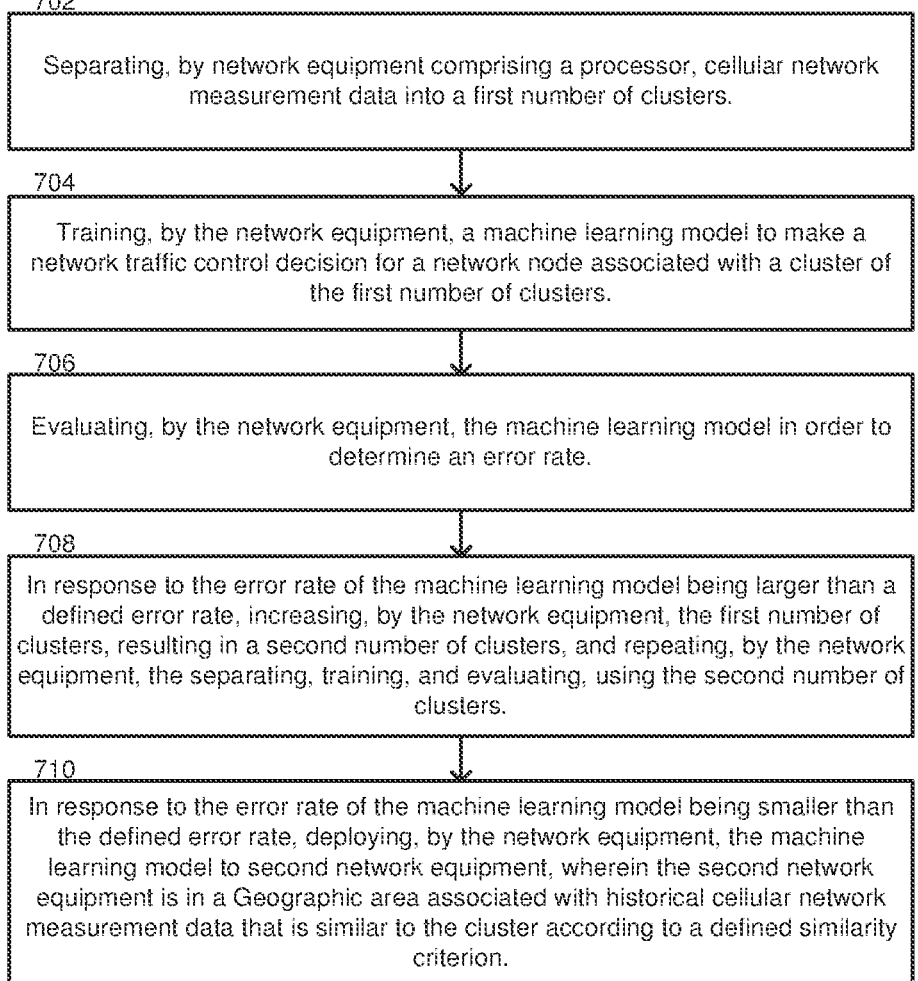

702

Separating, by network equipment comprising a processor, cellular network measurement data into a first number of clusters.

704

Training, by the network equipment, a machine learning model to make a network traffic control decision for a network node associated with a cluster of the first number of clusters.

706

Evaluating, by the network equipment, the machine learning model in order to determine an error rate.

708

In response to the error rate of the machine learning model being larger than a defined error rate, increasing, by the network equipment, the first number of clusters, resulting in a second number of clusters, and repeating, by the network equipment, the separating, training, and evaluating, using the second number of clusters.

710

In response to the error rate of the machine learning model being smaller than the defined error rate, deploying, by the network equipment, the machine learning model to second network equipment, wherein the second network equipment is in a Geographic area associated with historical cellular network measurement data that is similar to the cluster according to a defined similarity criterion.

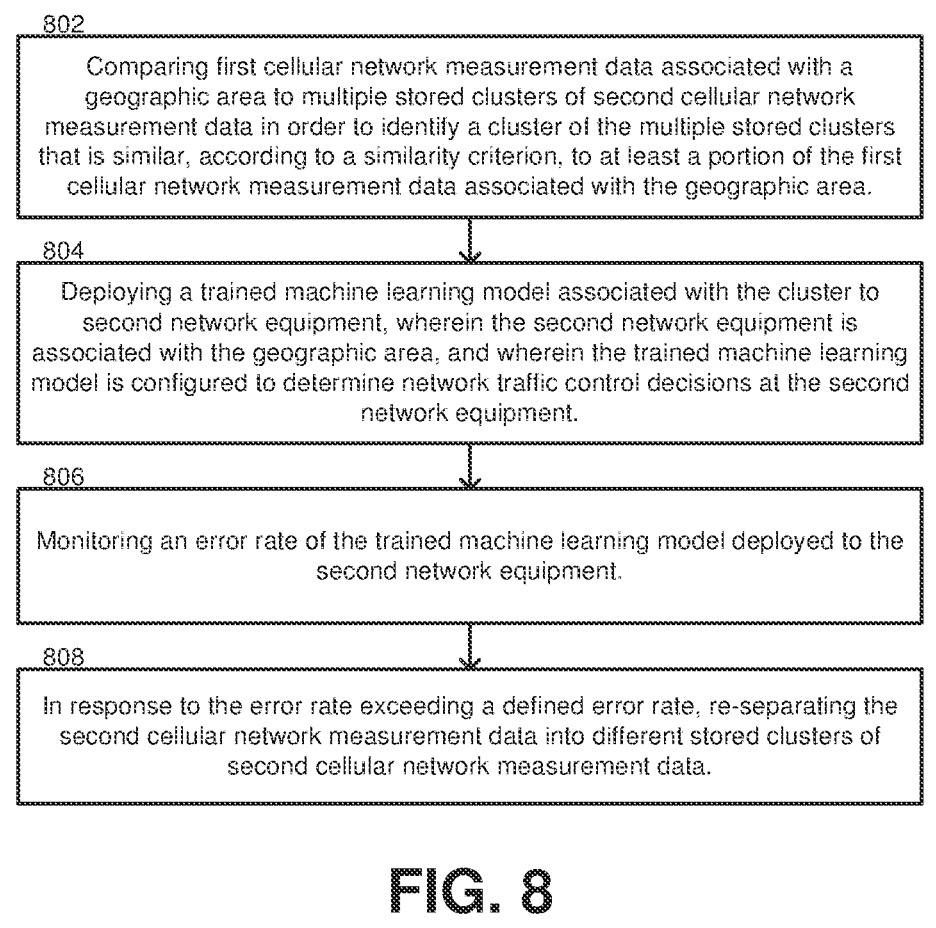

Comparing first cellular network measurement data associated with a geographic area to multiple stored clusters of second cellular network measurement data in order to identify a cluster of the multiple stored clusters that is similar, according to a similarity criterion, to at least a portion of the first cellular network measurement data associated with the geographic area.

804

Deploying a trained machine learning model associated with the cluster to second network equipment, wherein the second network equipment is associated with the geographic area, and wherein the trained machine learning model is configured to determine network traffic control decisions at the second network equipment.

806

Monitoring an error rate of the trained machine learning model deployed to the second network equipment.

808

In response to the error rate exceeding a defined error rate, re-separating the second cellular network measurement data into different stored clusters of second cellular network measurement data.

FIG. 8

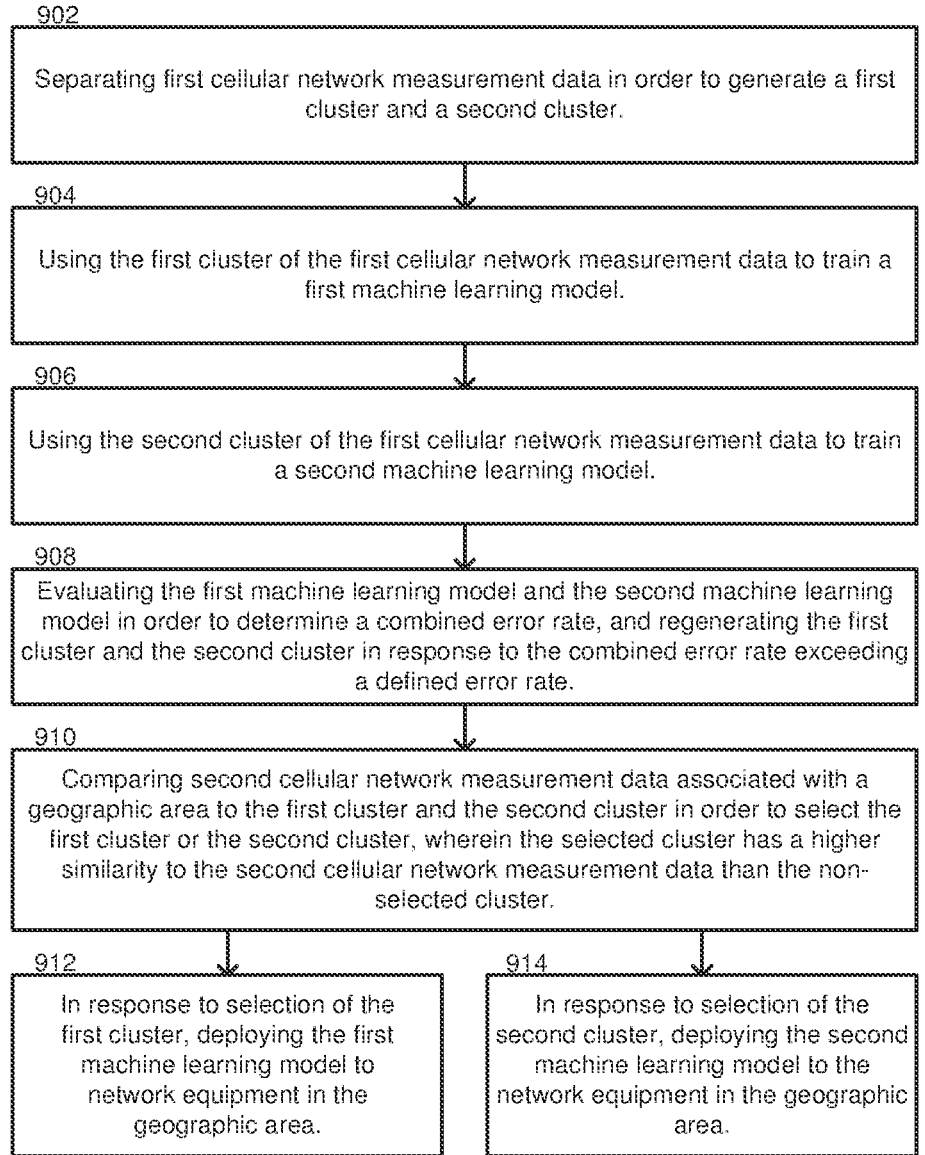

902

Separating first cellular network measurement data in order to generate a first cluster and a second cluster.

904

Using the first cluster of the first cellular network measurement data to train a first machine learning model.

906

Using the second cluster of the first cellular network measurement data to train a second machine learning model.

908

Evaluating the first machine learning model and the second machine learning model in order to determine a combined error rate, and regenerating the first cluster and the second cluster in response to the combined error rate exceeding a defined error rate.

910

Comparing second cellular network measurement data associated with a geographic area to the first cluster and the second cluster in order to select the first cluster or the second cluster, wherein the selected cluster has a higher similarity to the second cellular network measurement data than the non-selected cluster.

912

In response to selection of the first cluster, deploying the first machine learning model to network equipment in the geographic area.

914

In response to selection of the second cluster, deploying the second machine learning model to the network equipment in the geographic area.

FIG. 9

DATA CLUSTERING FOR NETWORK TRAFFIC MODELING

TECHNICAL FIELD

The subject application is related to modeling cellular network traffic in order to improve network control decisions, e.g., in fourth generation (4G), fifth generation (5G), and/or subsequent generation cellular networks.

BACKGROUND

Cellular network traffic is constantly shifting from place to place, expanding, and contracting. Network control decisions can help a cellular network adapt to changing traffic conditions. For example, load balancing decisions can change over time to adapt to expansion of traffic in some areas and contraction in others. Good network control decisions can lead to improved service for customers, while poor network control decisions can lead to worse service for customers.

In modern cellular communication networks, machine learning models can be employed to handle network control decisions under some circumstances. Machine learning models can handle adjustments of large numbers of variables, with a goal of, e.g., making a particular network node, or a group of network nodes, operate as efficiently as possible under different traffic conditions.

The use of machine learning models solves some problems while creating others. In one example scenario, machine learning models can be deployed to individual network nodes that host cell sites. A machine learning model can learn about traffic patterns at a cell site, and make network control decisions that improve each cell's performance. In this arrangement, measurement data is collected for a cell site for a relatively long period, such as months, and traffic models are built and tuned for each cell and cell-to-cell relation of the cell site. A large amount of time, effort, and data goes into building and tuning different machine learning models for different cell sites.

In another example scenario, machine learning models can be employed at a control hub for an entire area including many different network nodes that host cell sites. This approach involves collecting data for the entire area for a long period, such as months, and building and tuning a single traffic model for the entire area. While it avoids the need to build and tune many different machine learning models, the resulting machine learning model can be very complex and therefore hard to validate, track and update. Furthermore, due to the high complexity, the resulting machine learning model is generally less accurate than the approach that uses machine learning models at individual nodes.

The above example scenarios demonstrate that while machine learning models can be beneficially employed to help with network control decisions in cellular communications networks, it is an ongoing challenge to efficiently build and update machine learning models that yield acceptable accuracy under diverse network topologies and diverse network traffic conditions.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 7 is a flow diagram representing example operations of network equipment in connection with clustering cellular network data, and training and evaluating machine learning models for the resulting clusters, in accordance with various aspects and embodiments of the subject disclosure.

FIG. 8 is a flow diagram representing example operations of network equipment in connection with machine learning model deployment, in accordance with various aspects and embodiments of the subject disclosure.

FIG. 9 is a flow diagram representing example operations of network equipment in connection with training machine learning models and identifying appropriate machine learning models to deploy to different geographic areas, in accordance with various aspects and embodiments of the subject disclosure.

DETAILED DESCRIPTION

Figure 1:
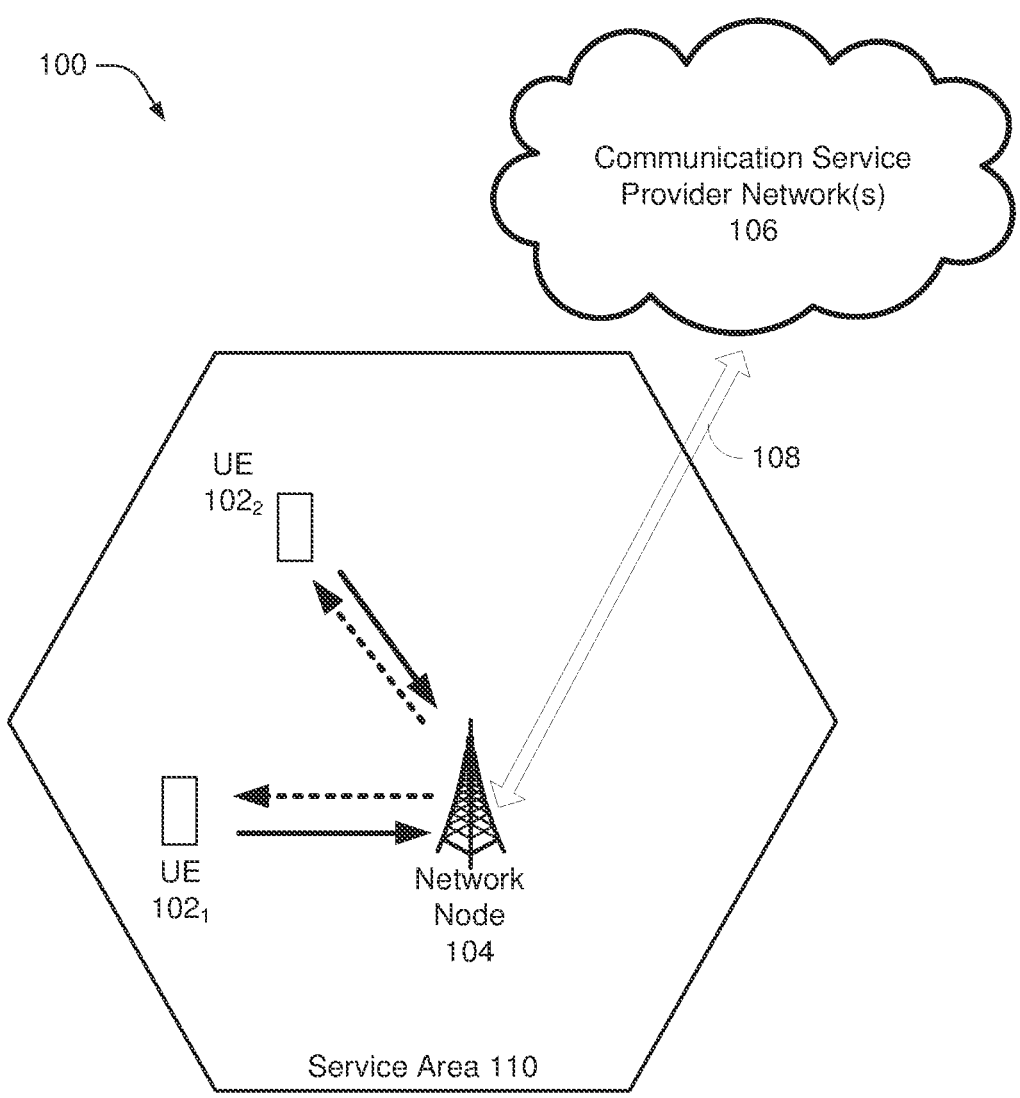
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards data clustering for network traffic modeling and controlling. Cellular network measurement data from many different geographic areas can be separated into clusters based on similarities in network performance indicators, cell traffic load data, and/or other metrics described herein. A machine learning model can then be assigned to each cluster, and the machine learning models can be trained to make network traffic control decisions under conditions exhibited in their respective clusters. If the error rate of the trained machine learning models is acceptable, then the machine learning models can be deployed for use at network equipment. If the overall error rate is not acceptable, then the cellular network measurement data can be re-separated into a larger number of clusters, and machine learning models can again be trained for each cluster. The re-separation of data and re-training of machine learning models can repeat until the error rate is acceptable and the machine learning models can be deployed. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
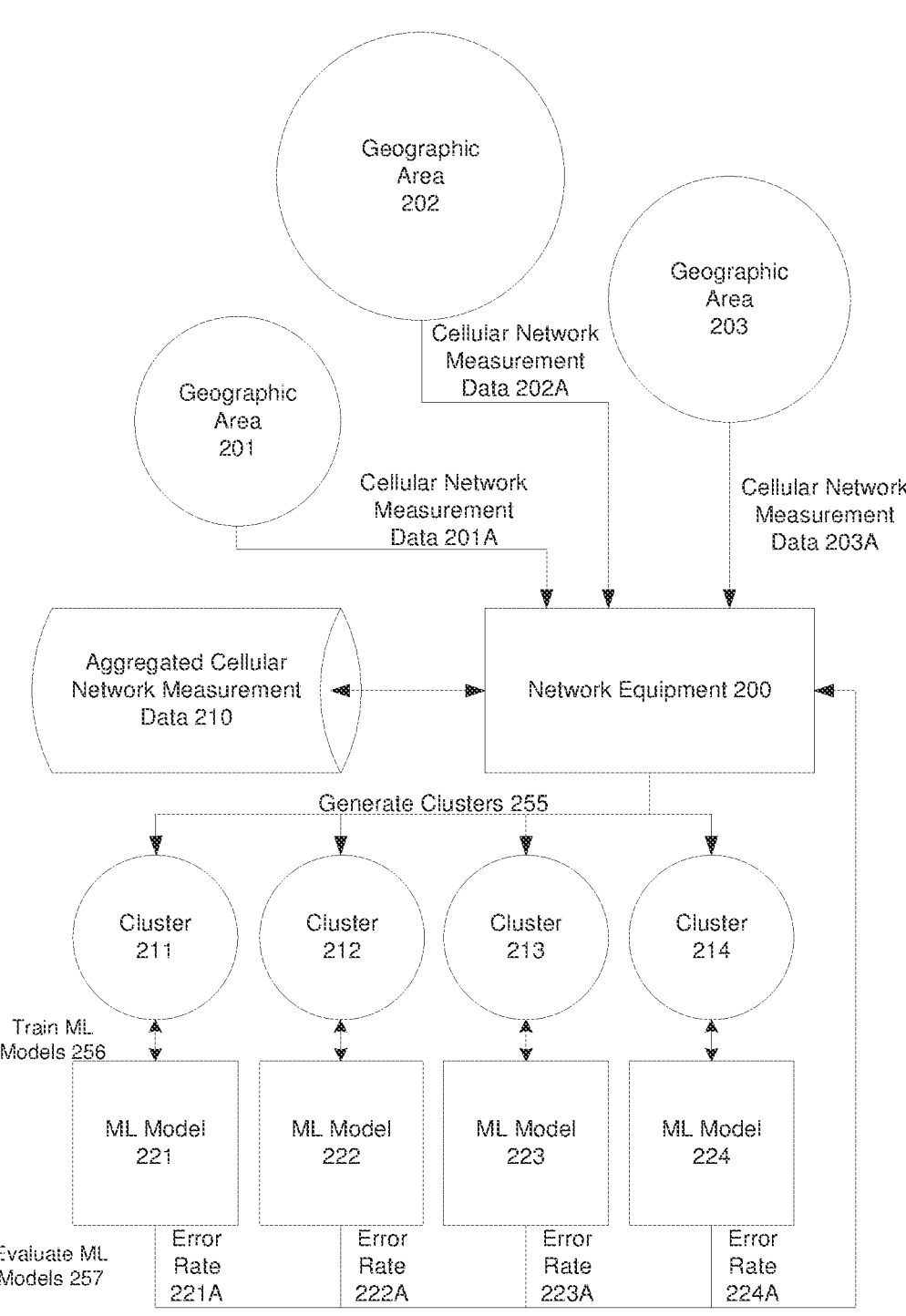
FIG. 2 illustrates example clustering of cellular network measurement data, as well as generating, training, and evaluating machine learning models for the data clusters, in accordance with various aspects and embodiments of the subject disclosure.

FIG. 2 illustrates example clustering of cellular network measurement data, as well as generating, training, and evaluating machine learning models for the data clusters, in accordance with various aspects and embodiments of the subject disclosure. FIG. 2 illustrates example network equipment 200, geographic areas 201, 202, 203, aggregated cellular network measurement data 210, a generate clusters 255 operation to generate clusters 211, 212, 213, and 214, a train ML models 256 operation to train machine learning (ML) models 221, 222, 223, and 224, and an evaluate ML models 257 operation to determine error rates 221A, 222A, 223A, and 224A.

In FIG. 2, network equipment 200, can comprise, e.g., equipment within communication service provider network(s) 106 introduced in FIG. 1. Also, geographic areas 201, 202, and 203 can each include network nodes such as network node 104 introduced in FIG. 1. In general, network equipment 200 can be configured to collect cellular network measurement data 201A, 202A, and 203A from the geographic areas 201, 202, and 203, e.g., by collecting cellular network measurement data 201A from network nodes in geographic area 201, collecting cellular network measurement data 202A from network nodes in geographic area 202, and collecting cellular network measurement data 203A from network nodes in geographic area 203. Network equipment 200 can be configured to store the collected cellular network measurement data 201A, 202A, and 203A as aggregated cellular network measurement data 210.

Network equipment 200 can furthermore be configured to perform the generate clusters 255 operation to identify clusters within the aggregated cellular network measurement data 210. In general, clusters can include cellular network measurement data from one or more network nodes, wherein each cluster has certain similar characteristics. Example characteristics that can be used to cluster the data include, e.g., network node performance characteristics and network node traffic load characteristics and their changing pattern over time.

Network equipment 200 can be configured to receive or determine an input number of clusters. For example, in FIG. 2, four example clusters are identified, including clusters 211, 212, 213, and 214. Network equipment 200 can generate clusters 255 by identifying, based on the input number of clusters, the characteristics or ranges of characteristics for the clusters 211, 212, 213, and 214, and by including cellular network data from network nodes in a cluster 211, 212, 213, or 214 based on the network nodes' displaying characteristics that are similar to the characteristics identified for the cluster 211, 212, 213, or 214.

Subsequent to generating clusters 255, network equipment 200 can be configured to train ML models 256. Network equipment 200 can build and train an ML model for each of the identified clusters 211, 212, 213, and 214. For example, network equipment 200 can build and train ML model 221 using cluster 211, network equipment 200 can build and train ML model 222 using cluster 212, network equipment 200 can build and train ML model 223 using cluster 213, and network equipment 200 can build and train ML model 224 using cluster 214.

Network equipment 200 can be configured to evaluate ML models 257. By evaluating the trained ML models 221, 222, 223, and 224, network equipment 200 can determine an error rate associated with each of ML models 221, 222, 223, and 224. For example, network equipment 200 can determine an error rate 221A for ML model 221, an error rate 222A for ML model 222, an error rate 223A for ML model 223, and an error rate 224A for ML model 224. The error rates 221A, 222A, 223A, and 224A can represent e.g. an accuracy of a respective ML model in predicting behavior of network nodes in a respective cluster, and/or the corresponding ability of the respective ML model to correctly make network control decisions for network nodes in a respective cluster.

Network equipment 200 can be configured to combine the error rates 221A, 222A, 223A, and 224A of the ML models 221, 222, 223, and 224, resulting in a combined error rate. For example, network equipment 200 can add the error rates, average the error rates, determine a mean error rate, or otherwise combine the error rates. Network equipment 200 can then compare the combined error rate with a defined error rate, e.g., a predetermined acceptable combined error rate for the ML models.

Figure 4:
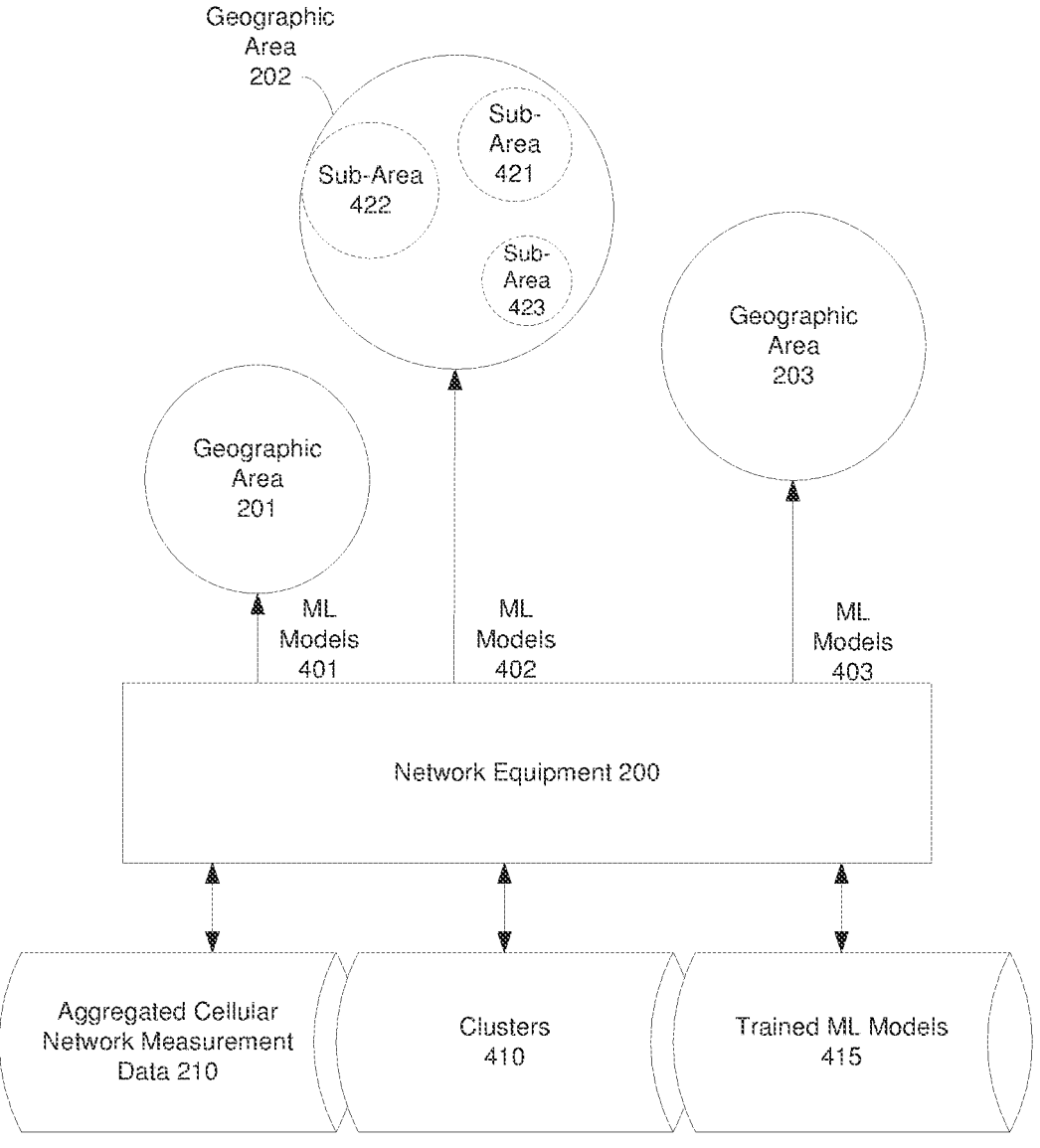
FIG. 4 illustrates example deployment of machine learning models to network equipment in different geographic areas, in accordance with various aspects and embodiments of the subject disclosure.

If the combined error rate is less than the defined error rate, then the ML models 221, 222, 223, and 224 are ready for deployment and network equipment 200 can deploy the ML models 221, 222, 223, and 224 to network nodes and/or other network equipment in geographic areas 201, 202, and 203. Deployment of ML models to network equipment in geographic areas 201, 202, and 203 is illustrated in FIG. 4.

Figure 3:
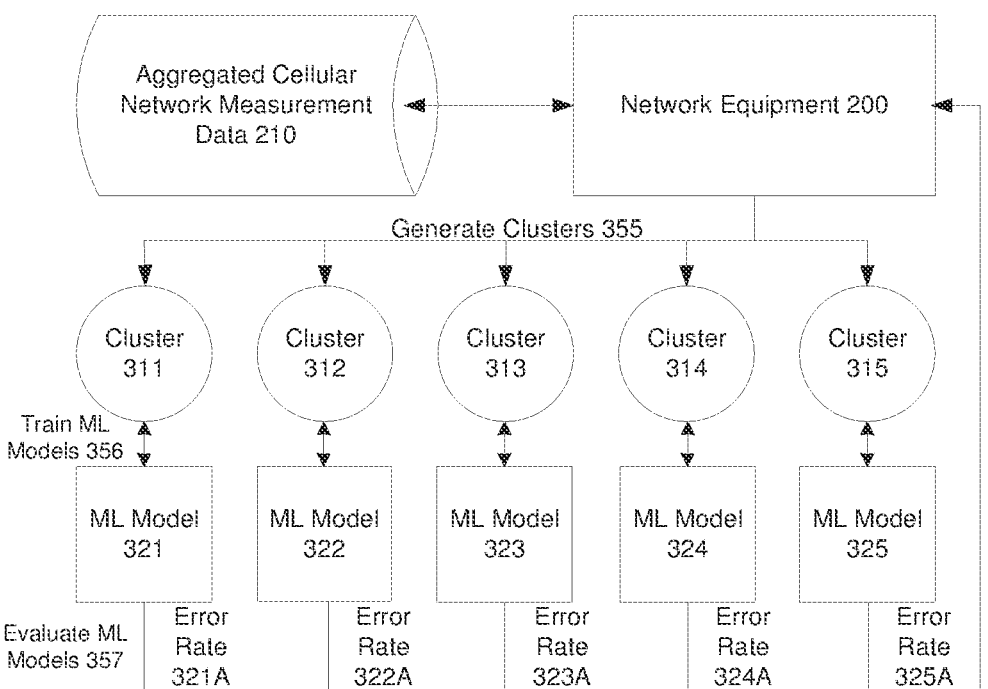
FIG. 3 illustrates example re-clustering of the cellular network measurement data, as well as re-generating, re-training, and re-evaluating machine learning models for the new data clusters, in accordance with various aspects and embodiments of the subject disclosure.

If, conversely, the combined error rate is larger than the defined error rate, then the ML models 221, 222, 223, and 224 are not ready for deployment, and the network equipment 200 can increase the input number of clusters, re-cluster the aggregated cellular network measurement data 210, re-train and re-evaluate ML models, as illustrated in FIG. 3.

FIG. 3 illustrates example re-clustering of the cellular network measurement data, as well as re-generating, re-training, and re-evaluating machine learning models for the new data clusters, in accordance with various aspects and embodiments of the subject disclosure. FIG. 3 includes the example network equipment 200 and aggregated cellular network data 210 introduced in FIG. 2. FIG. 3 furthermore includes a generate clusters 355 operation whereby clusters 311, 312, 313, 314, and 315 can be generated, a train ML models 356 operation to train machine learning (ML) models 321, 322, 323, 324, and 325, and an evaluate ML models 357 operation to determine error rates 321A, 322A, 323A, 324A, and 325A.

Figure 5:
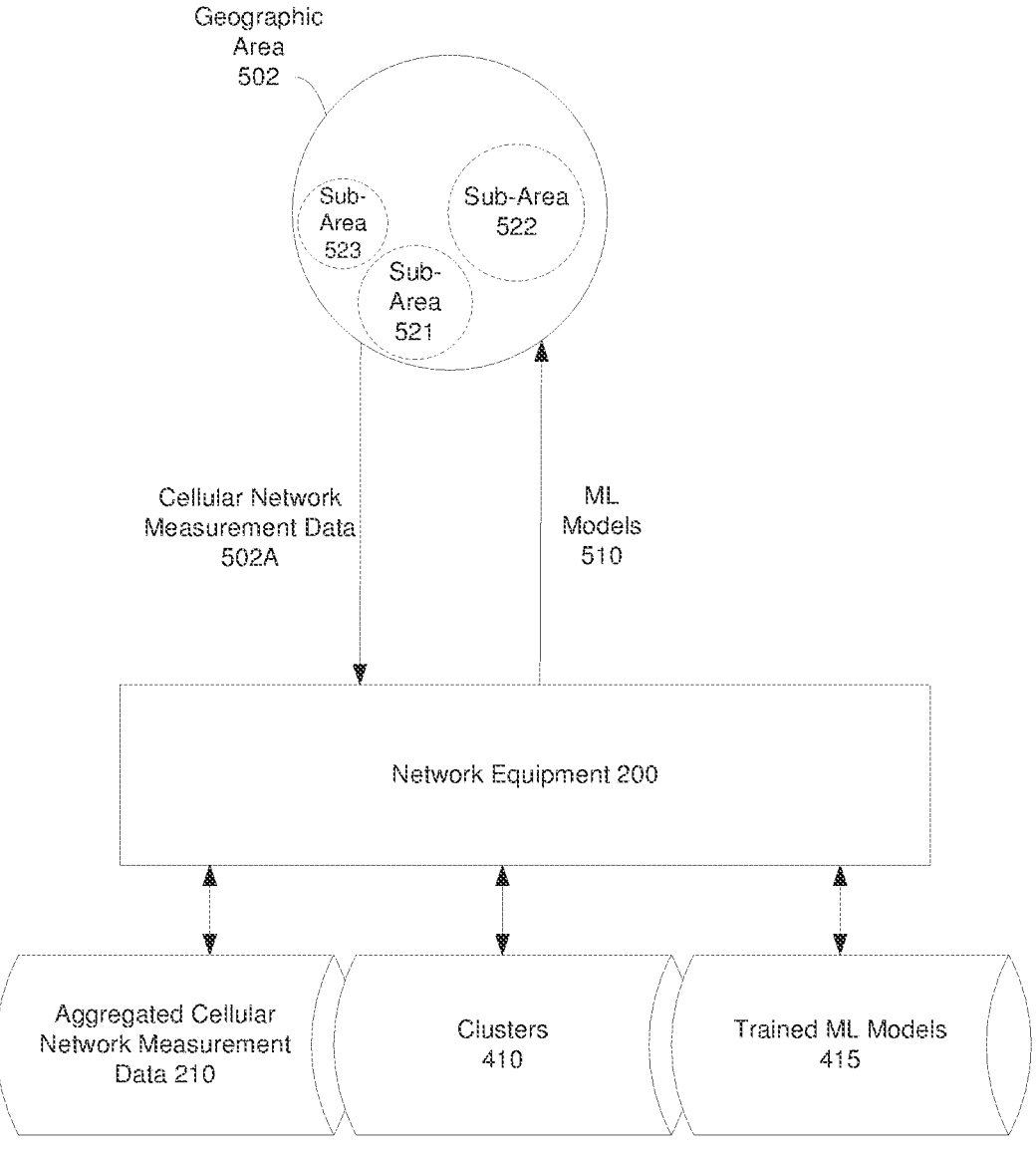
FIG. 5 illustrates example collection of cellular network measurement data from a new geographic area, as well as identifying and deploying machine learning models to network equipment in the new geographic area, in accordance with various aspects and embodiments of the subject disclosure.

FIG. 3 illustrates operations of network equipment 200 in response to the combined error rate being larger than the defined error rate, as described above with reference to FIG. 2. In FIG. 3, the network equipment 200 can increase the input number of clusters, e.g., from four clusters, represented in FIG. 2, to five clusters 311, 312, 313, 314, and 315 such as illustrated in FIG. 5. At generate clusters 355, the network equipment 200 can determine characteristics and/or ranges of characteristics for each of the five clusters 311, 312, 313, 314, and 315, and can re-cluster the aggregated cellular network measurement data 210 to thereby identify the network nodes and corresponding cellular network measurement data in each of clusters 311, 312, 313, 314, and 315.

After re-clustering the data, the network equipment 200 can train and evaluate ML models for each cluster, as described above in connection with FIG. 2. At train ML models 356, the network equipment 200 can build and train an ML model for each of the newly generated clusters 311, 312, 313, 314, and 315. For example, network equipment 200 can build and train ML model 321 using cluster 311, network equipment 200 can build and train ML model 322 using cluster 312, network equipment 200 can build and train ML model 323 using cluster 313, network equipment 200 can build and train ML model 324 using cluster 314, and network equipment 200 can build and train ML model 325 using cluster 315.

At evaluate ML models 357, network equipment 200 can be configured to evaluate the ML models 321, 322, 323, 324, and 325. Network equipment 200 can determine an error rate 321A for ML model 321, an error rate 322A for ML model 322, an error rate 323A for ML model 323, an error rate 324A for ML model 324, and an error rate 325A for ML model 325.

Network equipment 200 can be configured to combine the error rates 321A, 322A, 323A, 324A, and 325A of the ML models 321, 322, 323, 324, and 325, resulting in a new combined error rate, which is new with respect to the previous combined error rate determined in connection with FIG. 2. Network equipment 200 can then compare the new combined error rate with the defined error rate. Similar to FIG. 2, if the new combined error rate is less than the defined error rate, then the ML models 321, 322, 323, 324, and 325 are ready for deployment and network equipment 200 can deploy the ML models 321, 322, 323, 324, and 325 to network nodes and/or other network equipment in geographic areas 201, 202, and 203. If, conversely, the new combined error rate is larger than the defined error rate, then the ML models 321, 322, 323, 324, and 325 are not ready for deployment, and the network equipment 200 can again increase the input number of clusters, re-cluster the aggregated cellular network measurement data 210, re-train and re-evaluate ML models. The network equipment 200 can continue to loop operations such as illustrated in FIG. 3 as many times as needed, increasing the number of clusters each time, until a combined error rate is equal to and/or less than the defined error rate.

FIG. 4 illustrates example deployment of machine learning models to network equipment in different geographic areas, in accordance with various aspects and embodiments of the subject disclosure. FIG. 4 comprises network equipment 200, geographic areas 201, 202, and 203, and aggregated cellular network measurement data 210, introduced in FIG. 2. FIG. 4 further comprises example sub-areas 421, 422, and 423 of geographic area 202. FIG. 4 further comprises ML models 401 deployed to geographic area 201, ML models 402 deployed to geographic area 202, and ML models 403 deployed to geographic area 203. FIG. 4 further comprises clusters 410 and trained ML models 415.

In an example according to FIG. 4, operations described in connection with FIG. 2 and FIG. 3 have been repeated until a combined error rate is equal to and/or less than a defined error rate. The group of trained ML models associated with the acceptable error rate can be stored as trained ML models 415, and the group of clusters used to train the trained ML models 415 can be stored as clusters 410. As will be appreciated, in some embodiments, storing cluster identification information in aggregated cellular network measurement data 210 can effectively identify stored clusters, without necessarily separately storing cluster information in clusters 410.

Some of the trained ML models 415 can be deployed to geographic area 201 as ML models 401. Some of the trained ML models 415 can be deployed to geographic area 202 as ML models 402. Some of the trained ML models 415 can be deployed to geographic area 203 as ML models 403. Some of the trained ML models, for example ML models 401, can be deployed to multiple geographic areas, for example to both geographic area 201 and geographic area 202, if the geographic areas 201, 202 have similar characteristics.

To determine which of the trained ML models 415 to include in ML models 401, ML models 402, or ML models 403, network equipment 200 can be configured to compare cellular network measurement data from a geographic area 201, 202, or 203 with clusters 410. Network equipment 200 can then select one or more of the clusters 410 based on the comparison. Network equipment 200 can retrieve, from the trained ML models 415, the ML models that correspond to the selected clusters. The retrieved ML models can be included in the ML models 401, 402, or 403 sent to a geographic area 201, 202, or 203.

For example, network nodes within sub-areas 421 and 422 may both be associated with cellular network measurement data that is similar to a first cluster within clusters 410, while network nodes within sub-area 423 may be associated with cellular network measurement data that is similar to a second cluster within clusters 410. The network equipment 200 can be configured to retrieve, from ML models 415, ML models corresponding to the first cluster and the second cluster. Network equipment 200 can be configured to send the ML model corresponding to the first cluster to network nodes (or other network equipment) associated with sub-areas 421 and 422, and network equipment 200 can be configured to send the ML model corresponding to the second cluster to network nodes (or other network equipment) associated with sub-area 423.

In another example, network nodes within geographic area 201 may be associated with cellular network measurement data that is similar to a third cluster within clusters 410. The network equipment 200 can be configured to retrieve, from ML models 415, an ML model corresponding to the third cluster. Network equipment 200 can be configured to send the ML model corresponding to the third cluster to network nodes (or other network equipment) associated with geographic area 201. Network equipment 200 can include the ML model corresponding to the third cluster among ML models 401. Similarly, network equipment 200 can retrieve appropriate ML models for geographic are 203, and network equipment 200 can include the retrieved ML models in ML models 403.

FIG. 5 illustrates example collection of cellular network measurement data from a new geographic area, as well as identifying and deploying machine learning models to network equipment in the new geographic area, in accordance with various aspects and embodiments of the subject disclosure. FIG. 5 comprises network equipment 200, aggregated cellular network measurement data 210, clusters 410, and trained ML models 415, introduced in FIG. 2 and FIG. 4. FIG. 5 further comprises an example new geographic area 502. Geographic area 502 comprises example sub-areas 521, 522, and 523. Network equipment 200 can receive cellular network measurement data 502A from network nodes in geographic area 502, and network equipment 200 can provide ML models 510 to network nodes in geographic area 502.

In FIG. 5, the new geographic area 502 can comprise a geographic area that was not among the geographic areas 201, 202, and 203, i.e., geographic area 502 was not among the geographic areas which provided the data used for clustering and ML model training, as described in connection with FIGS. 2 and 3. For example, geographic area 502 can comprise a new service area which was not previously served by a cellular service provider, or geographic area 502 can comprise a reconfigured service area which has changed by deployment or removal of network nodes in the geographic area 502. The network equipment 200 can be configured to determine a new group of ML models 510 for deployment to the geographic area 502.

Network equipment 200 can be configured compare the cellular network measurement data 502A to the data included in clusters 410. Network equipment 200 can compare, in particular, certain aspects of the cellular network measurement data 502A to certain aspects of data included in clusters 410, such as network node performance data and network node traffic load data and their changing pattern over time. Network equipment 200 can select one or more clusters from clusters 410, wherein the selected clusters include data similar to cellular network measurement data 502A, according to similarity criteria. Network equipment 200 can then retrieve, from trained ML models 415, ML models corresponding to the selected clusters. Network equipment 200 can include the retrieved ML models in ML models 510.

Similar to the deployment of ML models described above in connection with FIG. 4, different ML models of ML models 510 can optionally be deployed to different sub-areas 521, 522, and 523. For example, network nodes within sub-areas 521 and 522 may both be associated with cellular network measurement data that is similar to a first cluster within clusters 410, while network nodes within sub-area 523 may be associated with cellular network measurement data that is similar to a second cluster within clusters 410. The network equipment 200 can be configured to retrieve, from ML models 415, ML models corresponding to the first cluster and the second cluster. Network equipment 200 can be configured to send the ML model corresponding to the first cluster to network nodes (or other network equipment) associated with sub-areas 521 and 522, and network equipment 200 can be configured to send the ML model corresponding to the second cluster to network nodes (or other network equipment) associated with sub-area 523.

Figure 6:
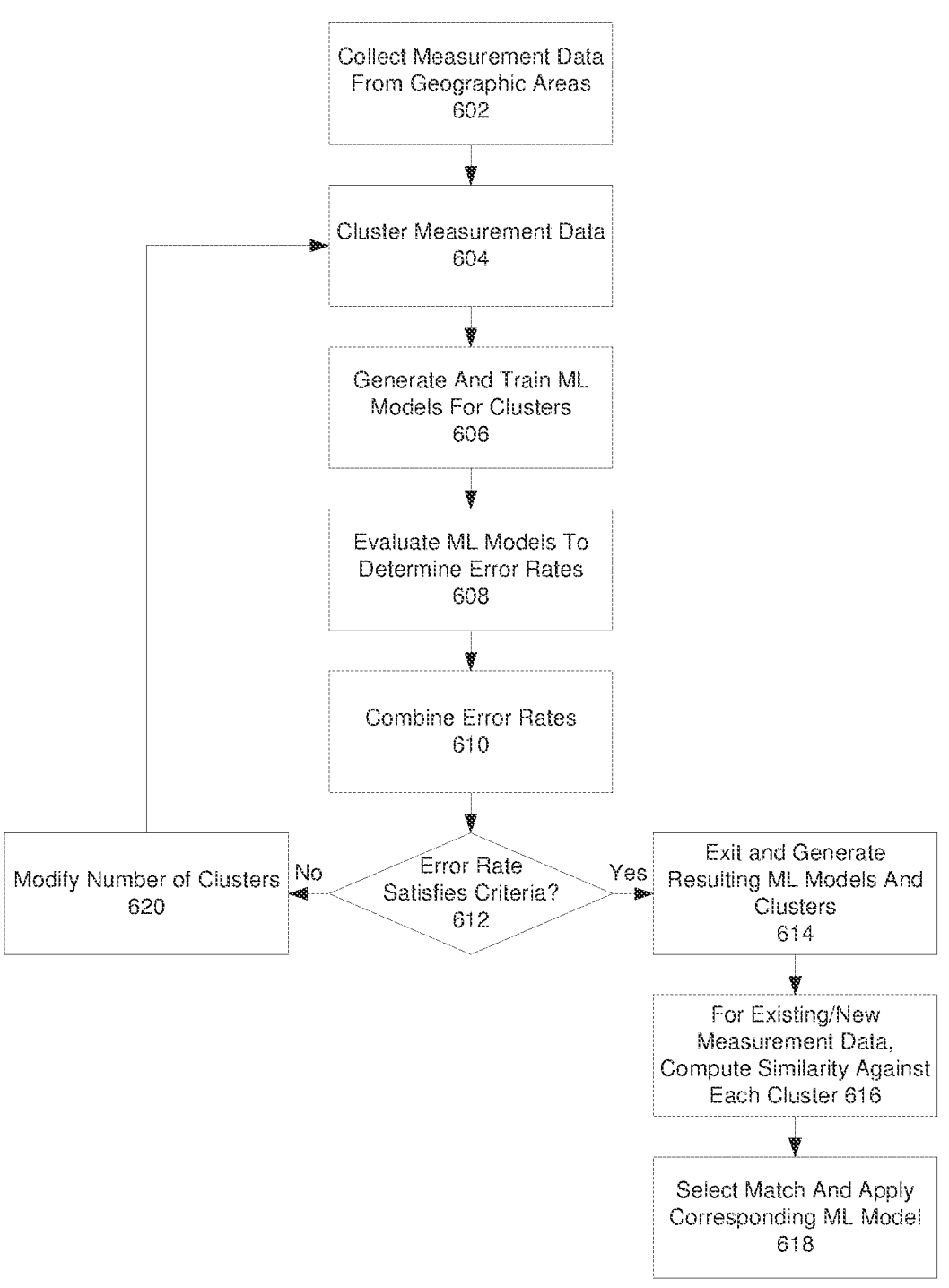
FIG. 6 is a flow diagram representing example operations of network equipment in connection with clustering data from geographic areas, generating machine learning models for the clusters, and deploying the machine learning models to the geographic areas, in accordance with various aspects and embodiments of the subject disclosure.

FIG. 6 is a flow diagram representing example operations of network equipment in connection with clustering data from geographic areas, generating machine learning models for the clusters, and deploying the machine learning models to the geographic areas, in accordance with various aspects and embodiments of the subject disclosure. FIG. 6 comprises, "collect measurement data from geographic areas" 602, followed by "cluster measurement data" 604, followed by "generate and train ML models for clusters" 606, followed by "evaluate ML models to determine error rates" 608, followed by "combine error rates" 610, followed by "error rate satisfies criteria?" 612.

If the error rate satisfies the criteria at 612 ("yes"), then operations can proceed to "exit and generate resulting ML models and clusters" 614, followed by "for existing/new measurement data, compute similarity against each cluster" 616, followed by "select best match and apply corresponding ML model" 618. If the error rate does not satisfy the criteria at 612 ("no"), then operations can proceed to "modify number of clusters" 620, followed by a return to "cluster measurement data" 604.

The operations illustrated in FIG. 6 can be performed by network equipment 200 as described with reference to FIGS. 2-5. At 602, network equipment 200 can collect cellular network measurement data 201A, 202A, and 203A from geographic areas 201, 202, and 203. At 604, the network equipment 200 can cluster the aggregated cellular network measurement data 210, thereby forming a first group of clusters 211, 212, 213, and 214. At 606, the network equipment 200 can generate and train the ML models 221, 222, 223, and 224 for the clusters 211, 212, 213, and 214. At 608, the network equipment 200 can evaluate the ML models 221, 222, 223, and 224 to determine error rates 221A, 222A, 223A, and 224A. At 610, the network equipment 200 can combine the error rates 221A, 222A, 223A, and 224A. At 612, the network equipment 200 can compare a combined error rate to a defined error rate in order to determine if the combined error rate satisfies criteria.

In an example wherein the combined error rate does not satisfy criteria at 612, the network equipment 200 can modify the number of clusters 620, e.g., by incrementing the input number of clusters. The incrementing can result in, e.g. the five clusters illustrated in FIG. 3, instead of the four clusters illustrated in FIG. 4. The network equipment 200 can repeat the operations 604, 606, 608, 610, and 612 for the new number of input clusters (e.g., clusters 311, 312, 313, 314, and 315 illustrated in FIG. 3), resulting in the new trained ML models 321, 322, 323, 324, and 325.

In an example wherein the combined error rates 321A, 322A, 323A, 324A, and 325A satisfy criteria at 612, the network equipment 200 can proceed at 614 to exit the loop comprising operations 604, 606, 608, 610, 612 and 620, and network equipment 200 can output the resulting ML models 321, 322, 323, 324, and 325 and clusters 311, 312, 313, 314, and 315, e.g., by storing ML models 321, 322, 323, 324, and 325 in trained ML models 415 and storing clusters 311, 312, 313, 314, and 315 in clusters 410.

At 616, network equipment 200 can determine which ML models to deploy to network nodes in geographic areas 201, 202, and 203, by comparing the measurement data from geographic areas 201, 202, and 203 to the clusters 410, and finding a similar cluster of clusters 410 that is similar to data from a network node or a group of network nodes in geographic areas 201, 202, and 203. Similarly, network equipment 200 can determine which ML models to deploy to new geographic areas such as 502. At 618, a similar cluster is selected for a network node or a group of network nodes, and a corresponding ML model, corresponding to the selected cluster, is applied to the network node or the group of network nodes.

With reference now to FIGS. 2-6 in general, in some aspects, a machine learning technique is applied to estimate traffic load and usage of LTE, 5G, and other next generation wireless networks. The technique can improve user experience and spectrum efficiency. Embodiments can efficiently build ML models for any traffic controllers, which can be deployed in cell sites and/or edge datacenters. Embodiments can cluster cells with their traffic load and performance characteristics and their changing pattern over time, instead of, e.g., grouping cells solely based on geolocation. With the disclosed clustering and similarity analysis, embodiments can build ML models for any new controller deployments into new areas, with lower time and measurement investments. While keeping reasonable ML model accuracy, embodiments can reduce ML model management cost including costs for storing and deploying ML models as well as the time for validating, tracking, and updating ML models.

Using the techniques disclosed herein, ML models can be built for groups of cells that have similar traffic load patterns and/or performance characteristics. A group of cells does not necessarily need to be located a contiguous geographic area. The total number of deployed ML models can be fewer than approaches that design ML models for specific geographic areas. Nonetheless, each ML model can have reasonable accuracy and can be simpler and more trackable than approaches that attempt to employ single ML models to large areas.

Embodiments can first cluster initial measurement data, collected from many areas, by similarity of traffic load, performance, and cell neighboring relations characteristics. For a new set of measurement data, embodiments can select a most similar existing cluster and corresponding ML model to apply, and the applied ML model can subsequently be tuned over time. If the combined error rate of ML models increases beyond a threshold, embodiments can repeat the disclosed process of clustering data and training and deploying ML models.

Some embodiments can reduce ML model management costs, including cost for storing and deploying ML models as well as the time for validating, tracking, and updating ML models, while keeping reasonable ML model accuracy. Furthermore, embodiments can be used to support field operators to make more efficient yet precise decisions regarding setting parameters, such as selecting certain groups of cells for which to allow load-balancing, and setting waiting times for starting carrier aggregation in certain target cell sites and areas. These types of decisions can otherwise be time and effort intensive.

ML models deployed according to this disclosure can comprise traffic controllers deployed in cell sites, control hubs, and core sites. Control hubs are network equipment that can be located in areas such as cities, sub-urban areas, and rural areas, and can control a group of cell sites in the area. Core sites can be located in a central data center and can control a group of control hubs.

In some embodiments, clustering data according to this disclosure can group data by similarity of cell traffic load, performance indicators, and/or relations with neighbor cells. Any of a variety of clustering technologies, including, e.g. K-mean type clustering, can be used to form clusters using a number of clusters as an input.

In order to compute similarity of cellular network measurement data to cluster data, similarity assessment techniques can be applied such as computing Euclidean distances and/or vector distances. Cellular network measurement data that can be used for similarity comparisons, as well as for clustering, can comprise, e.g., metrics based on cell traffic load and performance such as control channel element (CCE) utilization data, physical resource block (PRB) utilization data, number of concurrent UE sessions, and/or signal strength distributions such as RSRP and RSRQ distributions, which indicate how many UE sessions are at an edge or center of the distribution.

Furthermore, metrics such as numbers of active neighbor cells, retainability, accessibility, and throughput can be used in some embodiments. Some metrics can be based on cell relations, e.g., peak and time of UE handovers between serving and neighbor cells may be included in some embodiments. Instead of, or in addition to, absolute quantities of metrics, some embodiments can use qualitative characteristics such as the time of peak and duration of peak (daily, weekly, monthly), increasing or decreasing slopes, and variance, of the metrics selected for clustering and/or similarity comparisons.

FIG. 7 is a flow diagram representing example operations of network equipment in connection with clustering cellular network data, and training and evaluating machine learning models for the resulting clusters, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment 200 such as illustrated in FIGS. 2-5. Example operation 702 comprises separating, by network equipment 200 comprising a processor, cellular network measurement data, e.g., aggregated cellular network measurement data 210 into a first number of clusters, e.g., clusters 221, 222, 223, and 224.

In some embodiments, separating the cellular network measurement data 210 into the first number of clusters 221, 222, 223, and 224 can comprise identifying portions of the data having similar performance information, e.g., identifying a portion of the cellular network measurement data 210 that comprises similar performance data having greater similarity, according to a defined similarity criterion, than other portions of the cellular network measurement data 210.

In some embodiments, separating the cellular network measurement data 210 into the first number of clusters 221, 222, 223, and 224 can comprise identifying portions of the data having similar cell traffic load data, e.g., identifying a portion of the cellular network measurement data 210 that comprises similar cell traffic load data having greater similarity, according to a defined similarity criterion, than other portions of the cellular network measurement data 210.

In some embodiments, separating the cellular network measurement data 210 into the first number of clusters 221, 222, 223, and 224 can comprise identifying portions of the data having similar time of peak load data, e.g., identifying a portion of the cellular network measurement data 210 that comprises similar time of peak load data having greater similarity, according to a defined similarity criterion, than other portions of the cellular network measurement data 210.

In some embodiments, separating the cellular network measurement data 210 into the first number of clusters 221, 222, 223, and 224 can comprise identifying portions of the data having similar duration of peak load data, e.g., identifying a portion of the cellular network measurement data 210 that comprises similar duration of peak load data having greater similarity, according to a defined similarity criterion, than other portions of the cellular network measurement data 210.

Example operation 704 comprises training, by the network equipment 200, a machine learning model, e.g., ML model 221, to make a network traffic control decision for a network node associated with a cluster, e.g. cluster 211, of the first number of clusters. Network equipment can furthermore train machine learning models 222, 223, 224 to make network traffic control decisions for network nodes associated with clusters of the first number of clusters, e.g., for clusters 212, 213, and 214.

Example operation 706 comprises evaluating, by the network equipment 200, the machine learning model 221 in order to determine an error rate, e.g., error rate 221A. The error rate 221A can be combined with other error rates 222A, 223A, and 224A, resulting in a combined error rate that is associated with the machine learning models 221, 222, 223, and 224.

Example operation 708 comprises, in response to the error rate 221A of the machine learning model 221 being larger than a defined error rate, increasing, by the network equipment 200, the first number of clusters, resulting in a second number of clusters, e.g., increasing from four to five clusters as illustrated in FIGS. 2-3, and repeating, by the network equipment 200, the separating 702, training 704, and evaluating 706, using the second number of clusters.

Example operation 710 comprises, in response to the error rate 221A of the machine learning model 221 (optionally combined with the other error rates 222A, 223A, and 224A) being smaller than the defined error rate, deploying, by the network equipment 200, the machine learning model 221 to second network equipment, wherein the second network equipment is in a geographic area, e.g., geographic area 202, associated with historical cellular network measurement data, e.g., cellular network measurement data 202A, that is similar to the cluster 211 according to a defined similarity criterion.

FIG. 8 is a flow diagram representing example operations of network equipment in connection with machine learning model deployment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment 200 such as illustrated in FIGS. 2-5. Example operation 802 comprises comparing first cellular network measurement data, e.g., cellular network measurement data 202A associated with a geographic area 202 to multiple stored clusters, e.g., clusters 410 of second cellular network measurement data, e.g. of aggregated cellular network measurement data 210, in order to identify a cluster of the multiple stored clusters 410 that is similar, according to a similarity criterion, to at least a portion of the first cellular network measurement data 202A associated with the geographic area 202.

In some embodiments, comparing the first cellular network measurement data 202A associated with the geographic area 202 to the multiple stored clusters 410 of second cellular network measurement data 210 results in identifying clusters of the multiple stored clusters 410 that are similar, according to the similarity criterion, to portions of the first cellular network measurement data 202A associated with the geographic area 202. For example portions of the first cellular network measurement data 202A associated with sub-areas 421, 422, and 432 may be similar to different clusters among the clusters 410.

In some embodiments, comparing the first cellular network measurement data 202A associated with the geographic area 202 to the multiple stored clusters 410 of second cellular network measurement data 210 in order to identify the cluster can comprise comparing at least one of CCE utilization data, PRB utilization data, numbers of concurrent UE sessions, or signal strength distributions. In some embodiments, comparing the data can comprise comparing at least one of numbers of active neighbor cells, retainability information, accessibility information, or throughput information. In some embodiments, comparing the data can comprise comparing peak user equipment handover information.

Example operation 804 comprises deploying a trained machine learning model associated with the cluster, e.g., an ML model of ML models 402, to second network equipment, wherein the second network equipment is associated with the geographic area 202, and wherein the trained machine learning model is configured to determine network traffic control decisions at the second network equipment.

Deploying the trained machine learning model associated with the cluster to the second network equipment can comprise deploying trained machine learning models 402, i.e., multiple trained machine learning models 402 associated with the clusters to the second network equipment. The multiple trained machine learning models 402 be deployed to different sub-areas 421, 422, and 423.

Example operation 806 comprises monitoring an error rate of the trained machine learning model deployed to the second network equipment. For example, after an ML model of ML models 402 is deployed to a sub-area 422, the deployed ML model can occasionally report error rate information back to the network equipment 200. Example operation 808 comprises, in response to the error rate exceeding a defined error rate, re-separating the second cellular network measurement data 210 into different stored clusters of second cellular network measurement data. For example, if the combined error rate exceeds a threshold defined error rate, then the network equipment 200 can be configured to re-cluster the aggregated cellular network measurement data 210 and re-train, re-evaluate, and re-deploy ML models.

FIG. 9 is a flow diagram representing example operations of network equipment in connection with training machine learning models and identifying appropriate machine learning models to deploy to different geographic areas, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment 200 such as illustrated in FIGS. 2-5. Example operation 902 comprises separating first cellular network measurement data, e.g., aggregated cellular network measurement data 210 in order to generate a first cluster 211 and a second cluster 212. The first cluster 211 and the second cluster 212 can comprise cellular network measurement data associated with multiple different geographic areas 201, 202, and 203. Separating the first cellular network measurement data 210 in order to generate the first cluster 211 and the second cluster 212 can comprise separating the first cellular network measurement data 210 based on, e.g., performance indicators.

Example operation 904 comprises using the first cluster 211 of first cellular network measurement data 210 to train a first machine learning model 221. Example operation 906 comprises using the second cluster 212 of the first cellular network measurement data 210 to train a second machine learning model 222.

Example operation 908 comprises evaluating the first machine learning model 221 and the second machine learning model 222 in order to determine a combined error rate, and regenerating the first cluster 211 and the second cluster 212 in response to the combined error rate exceeding a defined error rate. For example, the first cluster 211 and the second cluster 212 can optionally be regenerated as clusters 311 and 312 when generating a new set of clusters 311, 312, 313, 314, and 315.

Example operation 910 comprises comparing second cellular network measurement data, e.g., cellular network measurement data 202A associated with a geographic area 202 to the first cluster 211 and the second cluster 212 in order to select the first cluster 211 or the second cluster 212, wherein the selected cluster 211 or 212 has a higher similarity to the second cellular network measurement data 202A than the non-selected cluster. Comparing the second cellular network measurement data 202A associated with the geographic area 202 to the first cluster 211 and the second cluster 212 can comprise, e.g., comparing performance indicators in the second cellular network measurement data 202A with performance indicators in the first cluster 211 and the second cluster 212.

If the first cluster 211 is selected at operation 910, then operation 912 can be performed. Operation 912 comprises, in response to selection of the first cluster 211, deploying the first machine learning model 221 to network equipment in the geographic area 202. If the second cluster 312 is selected at operation 910, then operation 914 can be performed. Operation 914 comprises, in response to selection of the second cluster 212, deploying the second machine learning model 222 to the network equipment in the geographic area 202.

Figure 10:
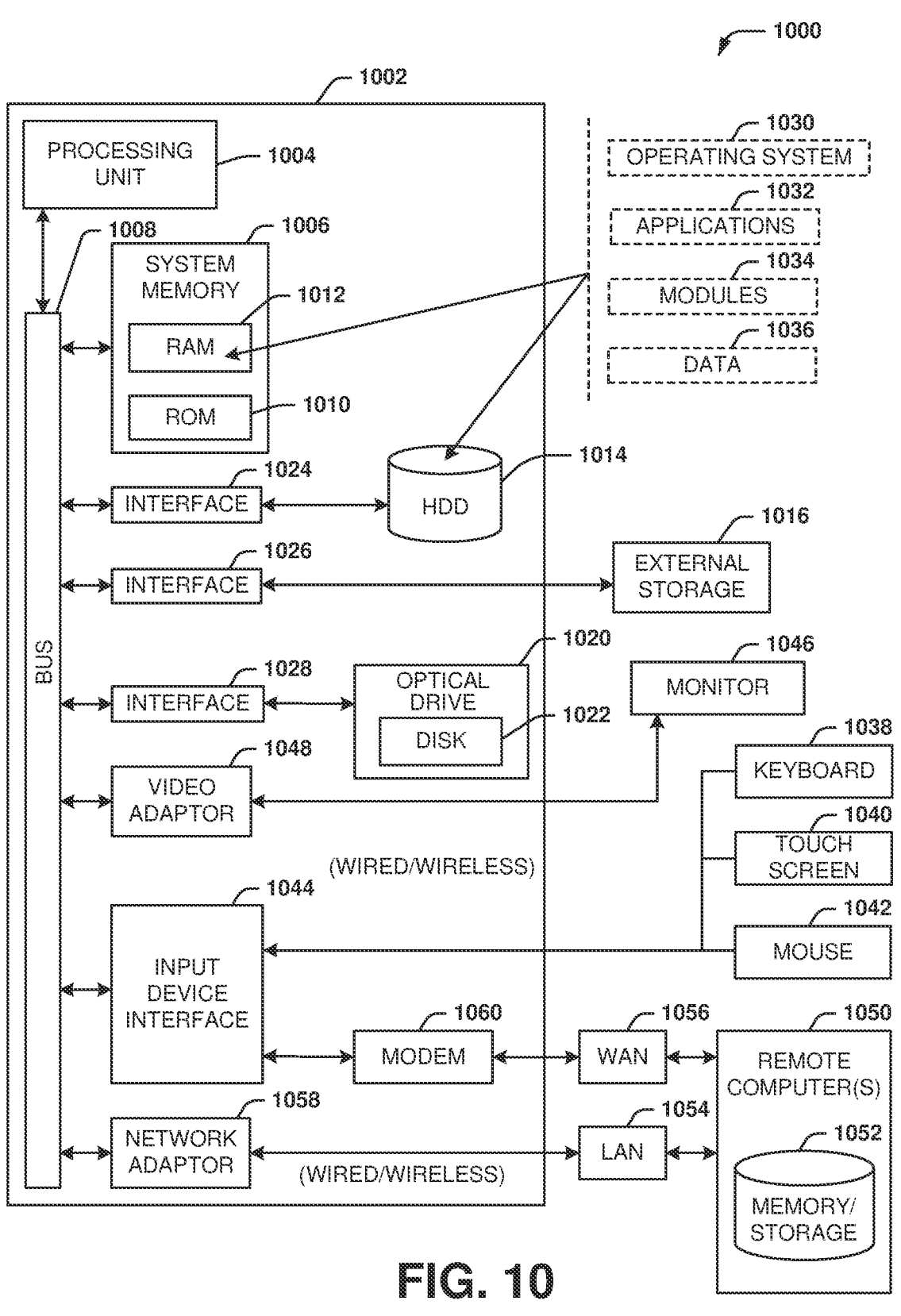
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

separating, by network equipment comprising a processor, cellular network measurement data into a first number of data clusters, wherein the separating of the cellular network measurement data into each data cluster is based on a defined similarity criterion specifying that each data cluster comprises portions of the cellular network measurement data having greater similarity with one another, according to the defined similarity criterion, than with other portions of the cellular network measurement data;

training, by the network equipment, a machine learning model to make a network traffic control decision for a network node associated with a data cluster of the first number of data clusters, wherein the network traffic control decision comprises at least one of: (i) performing load balancing between network nodes, (ii) adjusting cell site configuration parameters, (iii) selecting a group of cells for load-balancing, (iv) setting a waiting time for starting carrier aggregation in a target cell site or area, or a combination thereof;

evaluating, by the network equipment, the machine learning model in order to determine an error rate for an output of the machine learning model;

in response to the error rate of the machine learning model exceeding a defined threshold, increasing, by the network equipment, the first number of the data clusters by separating the cellular network measurement data into new clusters, resulting in a second number of data clusters, and repeating, by the network equipment, the training and evaluating, using the second number of data clusters, forming a trained machine learning model; and deploying, by the network equipment, the trained machine learning model to second network equipment, wherein the trained machine learning model is configured to determine network traffic control decisions at the second network equipment according to the training.

2. The method of claim 1, further comprising, in response to the error rate being smaller than the defined threshold, deploying, by the network equipment, the machine learning model to the second network equipment, wherein the second network equipment is in a geographic area associated with historical cellular network measurement data that is similar to the cellular network measurement data in the first number of data clusters according to a defined similarity criterion.

3. The method of claim 1, further comprising training, by the network equipment, machine learning models to make network traffic control decisions for network nodes associated with data clusters of the first number of data clusters.

4. The method of claim 1, wherein separating the cellular network measurement data into the first number of data clusters comprises identifying a portion of the cellular network measurement data that comprises similar performance data having greater similarity, according to a defined similarity criterion, than other portions of the cellular network measurement data.

5. The method of claim 1, wherein separating the cellular network measurement data into the first number of data clusters comprises identifying a portion of the cellular network measurement data that comprises similar cell traffic load data having greater similarity, according to a defined similarity criterion, than other portions of the cellular network measurement data.

6. The method of claim 1, wherein separating the cellular network measurement data into the first number of data clusters comprises identifying a portion of the cellular network measurement data that comprises similar time of peak load data having greater similarity, according to a defined similarity criterion, than other portions of the cellular network measurement data.

7. The method of claim 1, wherein separating the cellular network measurement data into the first number of data clusters comprises identifying a portion of the cellular network measurement data that comprises similar duration of peak load data having greater similarity, according to a defined similarity criterion, than other portions of the cellular network measurement data.

8. First network equipment, comprising:

a processor; and a memory that stores executable instructions that, when executed by the processor, facilitate performance of operations, comprising:

separating cellular network measurement data into data clusters, forming separated network measurement data, wherein the separating of the cellular network measurement data into each data cluster is based on a defined similarity criterion specifying that each data cluster comprises portions of the cellular network measurement data having greater similarity with one another, according to the defined similarity criterion, than with other portions of the cellular network measurement data;

storing the separated network measurement data as multiple stored data clusters of stored cellular network measurement data;

comparing first cellular network measurement data associated with a geographic area to multiple stored data clusters of the stored cellular network measurement data to identify a data cluster of the multiple stored data clusters that is similar, according to the similarity criterion specifying that the data cluster comprises portions of at least a portion of the first cellular network measurement data associated with the geographic area; and deploying a trained machine learning model associated with the data cluster to second network equipment, wherein the second network equipment is associated with the geographic area, and wherein the trained machine learning model is configured to determine network traffic control decisions at the second network equipment, wherein the network traffic control decisions comprise at least one of: (i) performing load balancing between network nodes, (ii) adjusting cell site configuration parameters, (iii) selecting a group of cells for load-balancing, (iv) setting a waiting time for starting carrier aggregation in a target cell site or area, or a combination thereof.

9. The first network equipment of claim 8, wherein comparing the first cellular network measurement data associated with the geographic area to the multiple stored data clusters of the stored cellular network measurement data results in identifying clusters of the multiple stored data clusters that are similar, according to the similarity criterion, to portions of the first cellular network measurement data associated with the geographic area, and wherein the deploying the trained machine learning model associated with the cluster to the second network equipment comprises deploying trained machine learning models associated with the clusters to the second network equipment.

10. The first network equipment of claim 8, wherein the operations further comprise monitoring an error rate of the trained machine learning model deployed to the second network equipment.

11. The first network equipment of claim 10, wherein the operations further comprise, in response to the error rate exceeding a defined error rate, re-separating the stored cellular network measurement data into different stored clusters of second cellular network measurement data.

12. The first network equipment of claim 8, wherein comparing the first cellular network measurement data associated with the geographic area to the multiple stored data clusters of the stored cellular network measurement data in order to identify the data cluster comprises comparing at least one of control channel element utilization data, physical resource block utilization data, numbers of concurrent user equipment sessions, or signal strength distributions.

13. The first network equipment of claim 8, wherein comparing the first cellular network measurement data associated with the geographic area to the multiple stored data clusters of the stored cellular network measurement data in order to identify the data cluster comprises comparing at least one of numbers of active neighbor cells, retainability information, accessibility information, or throughput information.

14. The first network equipment of claim 8, wherein comparing the first cellular network measurement data associated with the geographic area to the multiple stored data clusters of the stored cellular network measurement data in order to identify the data cluster comprises comparing peak user equipment handover information.

15. A non-transitory machine-readable medium, comprising executable instructions that, when executed by a processor, facilitate performance of operations, comprising:

obtaining cellular network measurement data;

separating the cellular network measurement data into data clusters, wherein the separating of the cellular network measurement data into each data cluster is based on a defined similarity criterion specifying that each data cluster comprises portions of the cellular network measurement data having greater similarity with one another, according to the defined similarity criterion, than with other portions of the cellular network measurement data;

training a first machine learning model using a first data cluster of first cellular network measurement data;

training a second machine learning model using a second data cluster of the first cellular network measurement data;

determining whether the first data cluster or the second data cluster has a higher similarity to second cellular network measurement data associated with a geographic area based on the defined similarity criterion specifying that each data cluster comprises portions of the cellular network measurement data having greater similarity with one another, according to the defined similarity criterion, than with other portions of the cellular network measurement data; and deploying the first machine learning model to network equipment in the geographic area responsive to the first data cluster having the higher similarity; or deploying the second machine learning model to the network equipment in the geographic area responsive to the second data cluster having the higher similarity, wherein the first machine learning model and the second machine learning model make a network traffic control decision for network nodes comprising at least one of: (i) performing load balancing between the network nodes, (ii) adjusting cell site configuration parameters, (iii) selecting a group of cells for load-balancing, (iv) setting a waiting time for starting carrier aggregation in a target cell site or area, or a combination thereof.

16. The non-transitory machine-readable medium of claim 15, wherein the operations further comprise separating the first cellular network measurement data in order to generate the first data cluster and the second data cluster.

17. The non-transitory machine-readable medium of claim 16, wherein separating the first cellular network measurement data in order to generate the first data cluster and the second data cluster comprises separating the first cellular network measurement data based on performance indicators.

18. The non-transitory machine-readable medium of claim 17, wherein the determining comprises comparing performance indicators in the second cellular network measurement data with performance indicators in the first data cluster and the second data cluster.

19. The non-transitory machine-readable medium of claim 15, wherein the first data cluster of first cellular network measurement data and the second data cluster of the first cellular network measurement data comprise cellular network measurement data associated with multiple different geographic areas.

20. The non-transitory machine-readable medium of claim 15, wherein the operations further comprise evaluating the first machine learning model and the second machine learning model in order to determine a combined error rate, and regenerating the first data cluster and the second data cluster in response to the combined error rate exceeding a defined error rate.

\* \* \* \* \*